May 8, 1923.

E. J. WINTER

APPARATUS FOR USE IN THE MANUFACTURE OF ALDEHYDES

Filed Dec. 24, 1918    5 Sheets-Sheet 1

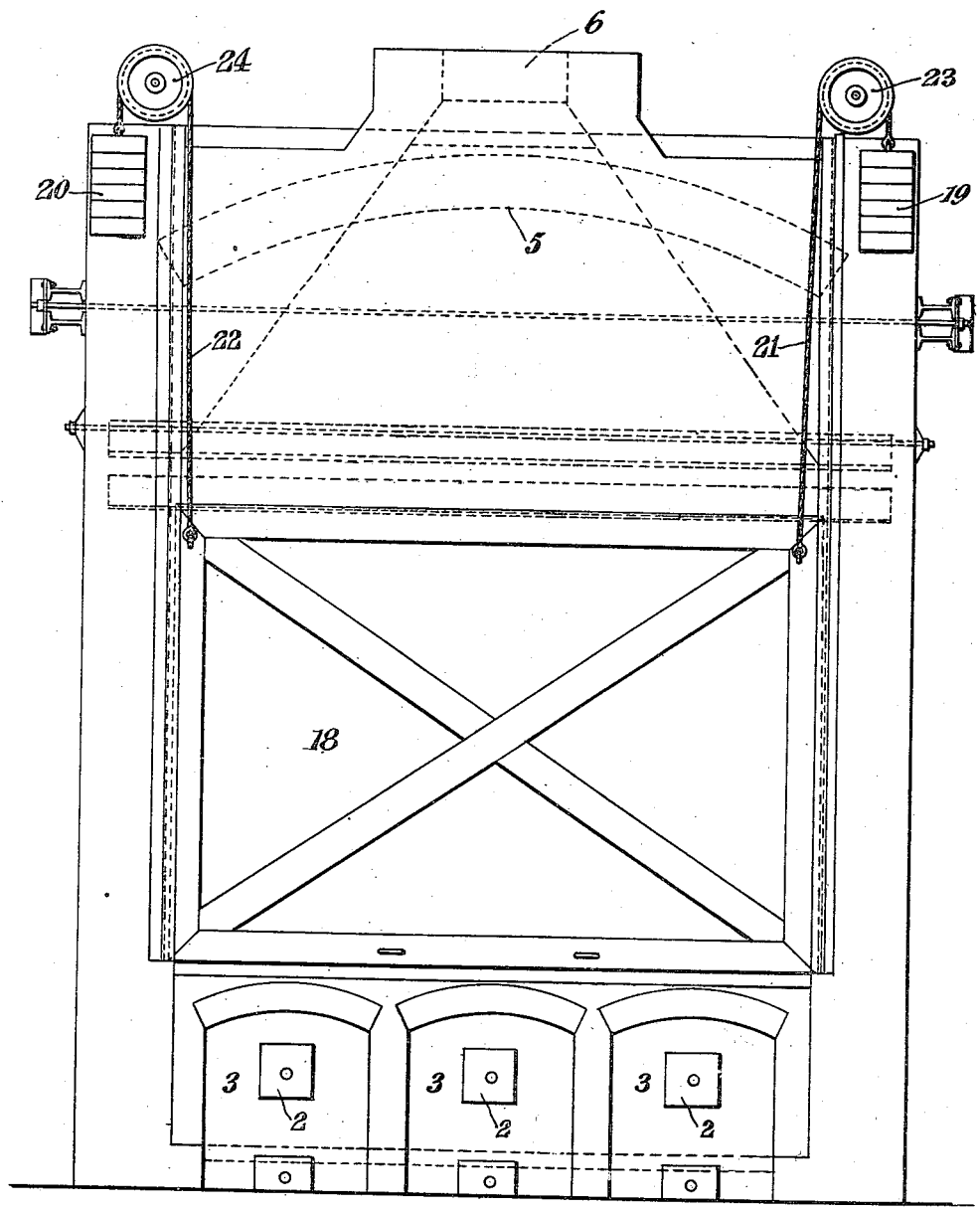

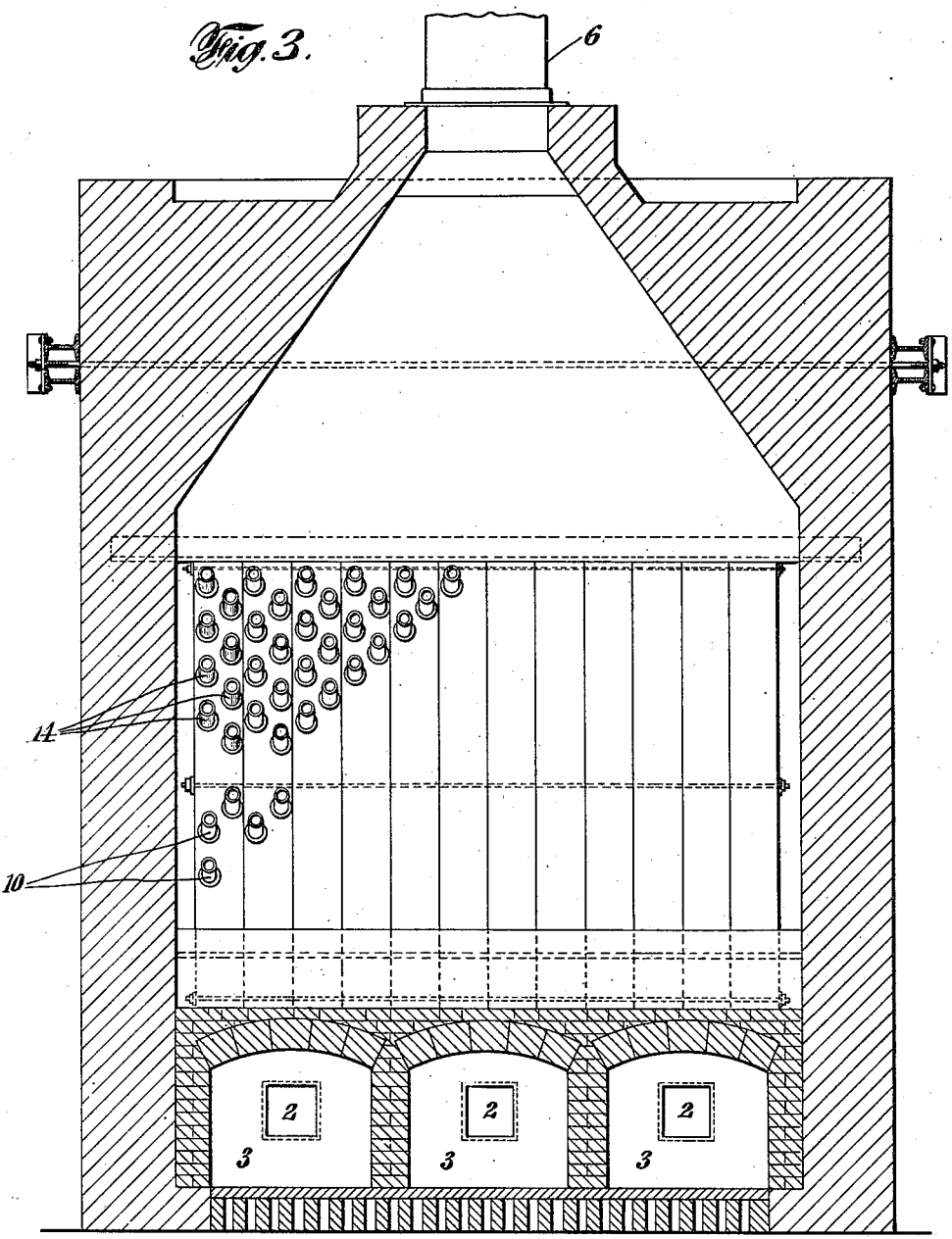

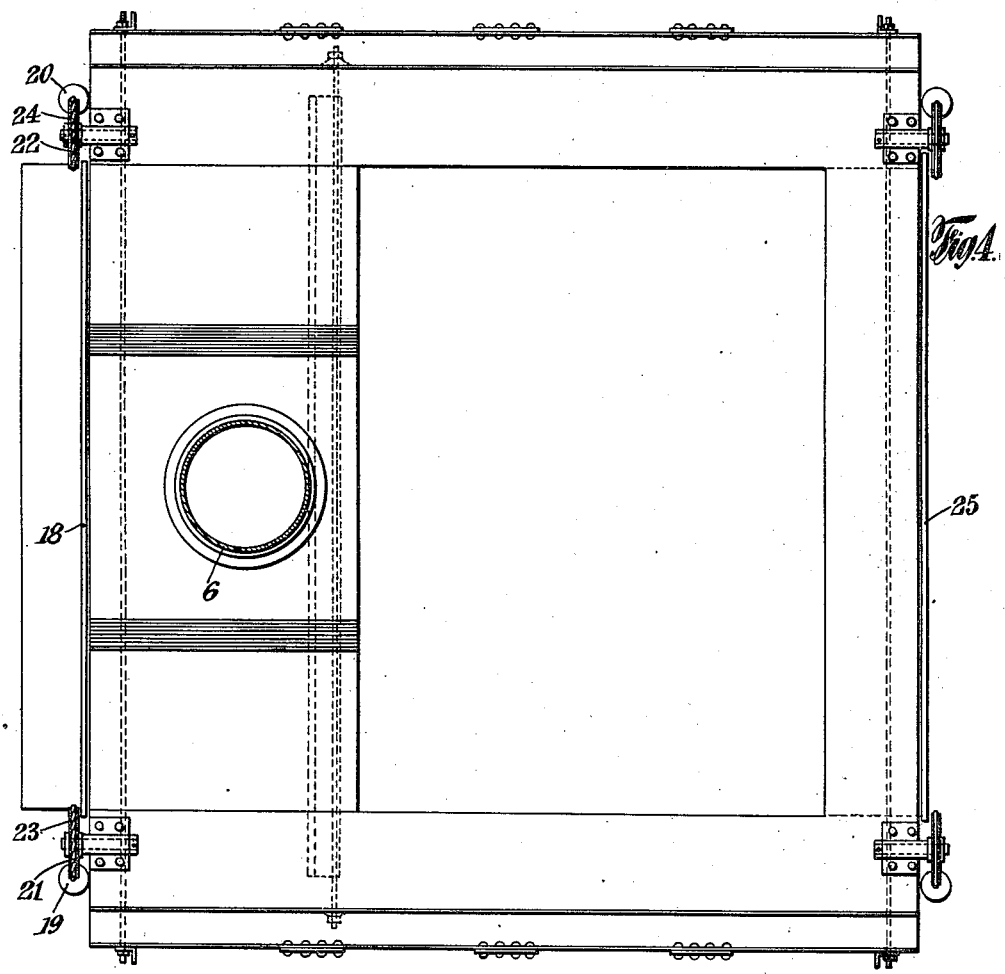
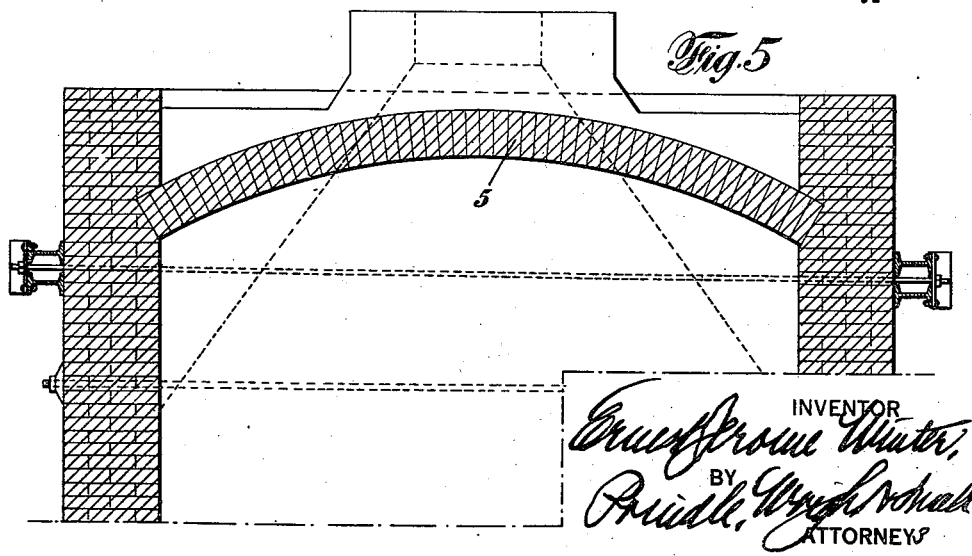

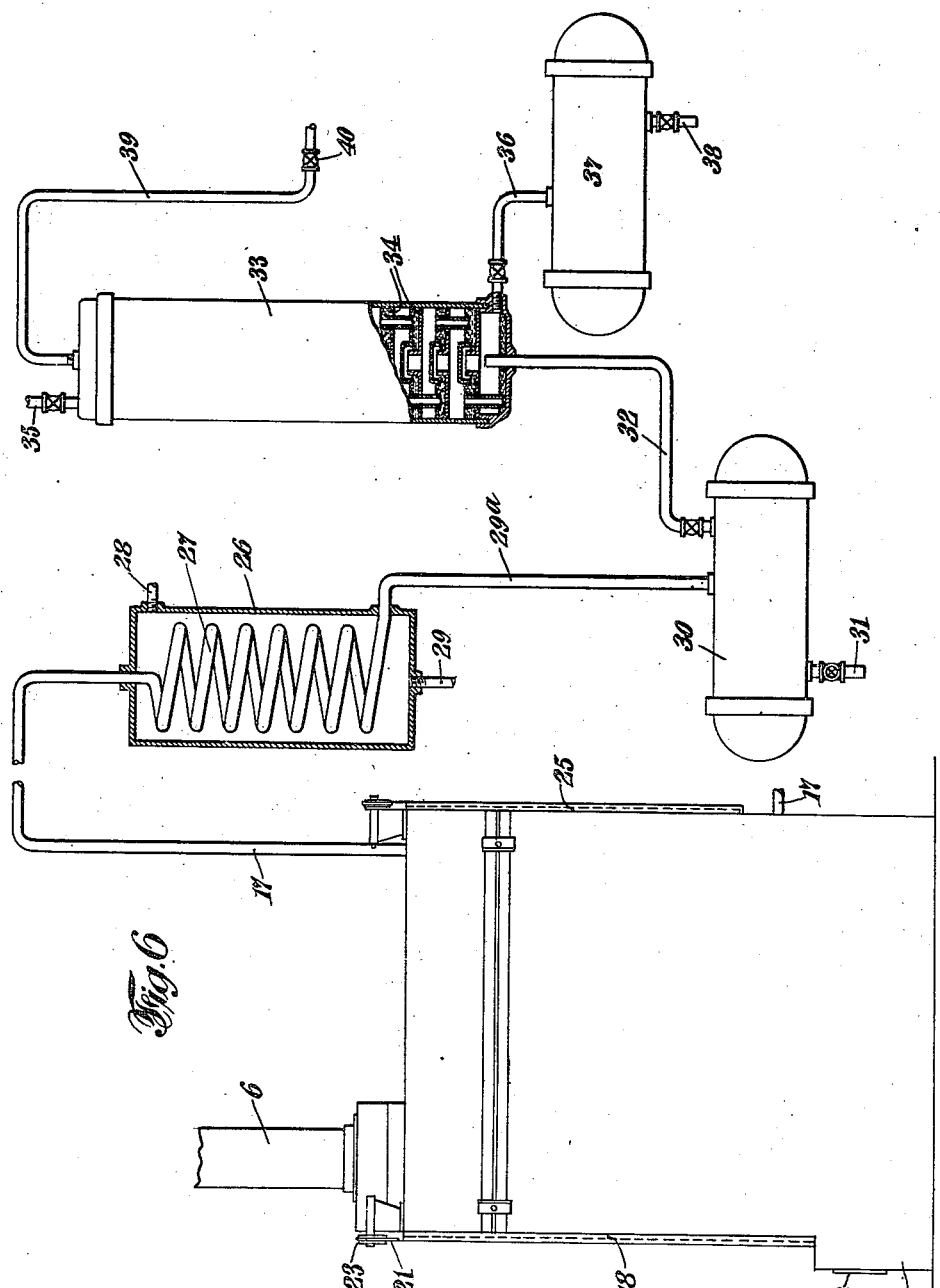

Patented May 8, 1923.

1,454,609

UNITED STATES PATENT OFFICE.

ERNEST J. WINTER, OF BALTIMORE, MARYLAND, ASSIGNOR TO U. S. INDUSTRIAL ALCOHOL CO., A CORPORATION OF WEST VIRGINIA.

APPARATUS FOR USE IN THE MANUFACTURE OF ALDEHYDES.

Application filed December 24, 1918. Serial No. 268,196.

*To all whom it may concern:*

Be it known that I, ERNEST J. WINTER, of Baltimore, in the State of Maryland, have invented a certain new and useful Improvement in Apparatus for Use in the Manufacture of Aldehydes, and do hereby declare that the following is a full, clear, and exact description thereof.

My invention relates particularly to apparatus for producing aldehydes, but it has reference especially to apparatus for the production of acetaldehyde.

The object of my invention is to provide an apparatus by means of which aldehydes, and particularly acetaldehyde, may be readily formed from the corresponding alcohol.

A further object is the provision of an apparatus containing a catalyzer that is arranged in an advantageous manner.

The object of my invention is especially, however, to provide an apparatus which comprises an alcohol heater and a catalyzer chamber of an advantageous type and in which a single fire-box is arranged to heat the alcohol heater and the catalyzer chamber, said alcohol heater and catalyzer chamber being arranged in the form of tubes, while the tubes in the latter chamber are inclined downwardly towards the inlet side so as to avoid any free space above the catalytic material therein along the lengths of said tubes.

A further object is to arrange said tubes in such a manner that the cold alcohol enters the fire-box at the hottest point, while the alcohol vapors are fed in such a manner as to enter the catalyzer chamber at the cooler end thereof.

Further objects of my invention will appear from the detailed description thereof contained hereinafter.

While my invention is capable of embodiment in many different forms, for the purpose of illustration I shall describe only one form of apparatus made in accordance with my invention in the accompanying drawings, in which—

Figure 2 is a front elevation of the same;

Figure 3 is a vertical section taken on line 3—3 of Figure 1;

Figure 4 is a plan view of the fire-box portion of the apparatus;

Figure 5 is a vertical section taken on the line 5—5 of Figure 1, and

Figure 6 is a diagrammatic representation of an entire installation.

Figure 1:
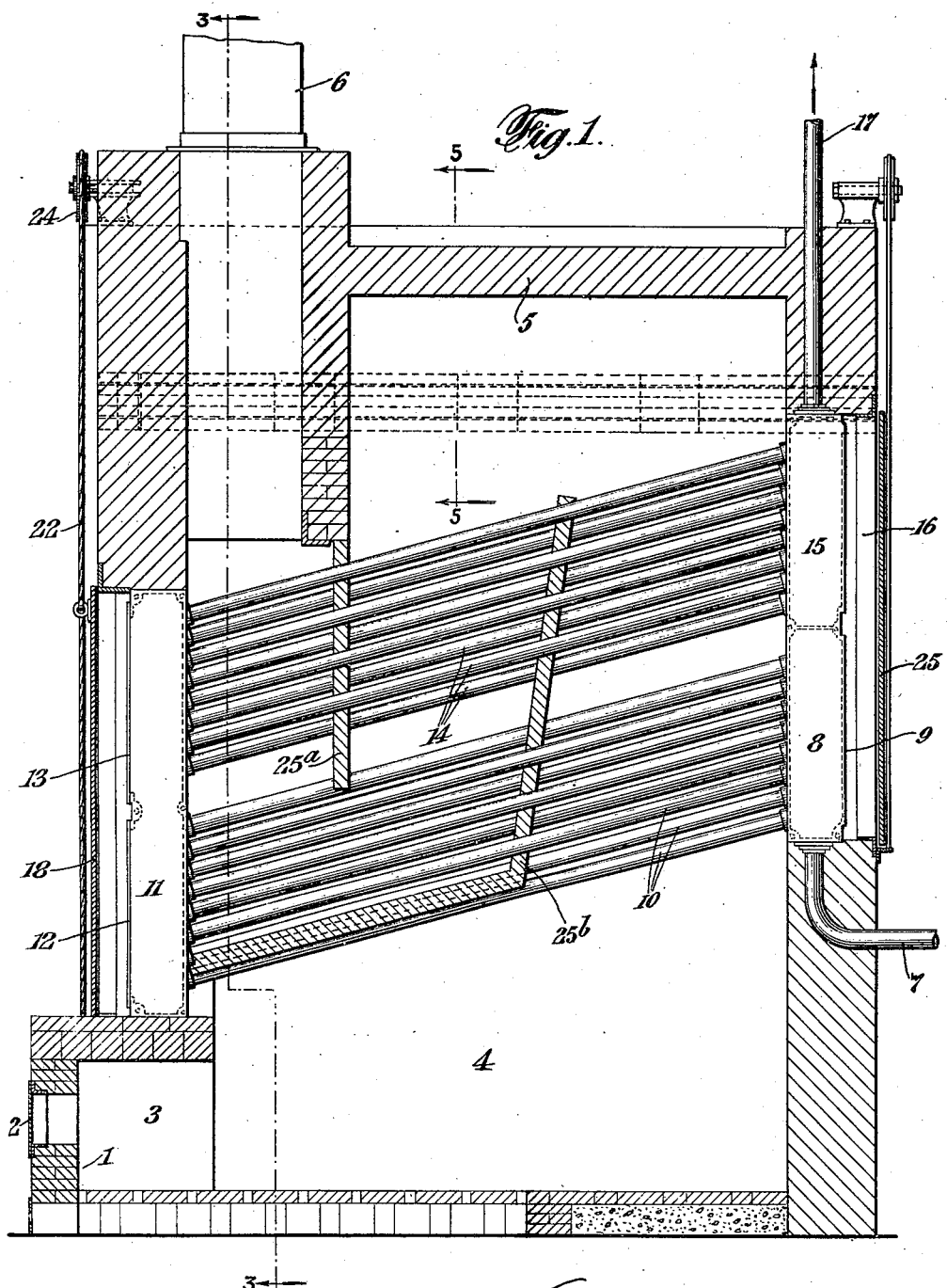
Figure 1 is a side elevation, partly in section, of an apparatus made in accordance with my invention.

In the drawings I have shown a fire-box 1, made of masonry, and having a plurality of doors 2 for the feeding of fuel thereto, which doors communicate with passageways 3 leading to a fire-box chamber 4, located beneath a masonry archway 5, having therein a stack 6. At the rear of the fire-box 1 there is an inlet pipe 7 for alcohol vapors, as for example ethyl alcohol, which delivers the alcohol to a lower rear vertical chamber 8, having a removable plate 9 at its rear face and a plurality of downwardly inclined tubes 10 at its front face. Said tubes 10 lead to a front vertical chamber 11, having a plurality of removable plates 12 and 13 on the front face thereof. The alcohol vapors ascend in the chamber 11, and are conveyed therefrom to another set of upwardly inclined tubes 14, which are filled with a catalytic agent, as for example pumice stone, unglazed porcelain, charcoal or terra cotta, carrying throughout the same particles of a finely divided catalyzer metal, such for example as copper, nickel, chromium or iron, which may be deposited therein by any suitable means, but preferably in such a manner as to involve the reduction of an oxide of the metal by a current of hydrogen, as for example in accordance with the process of making catalyzers set forth in application, Serial No. 240,221, filed June 15, 1918, by Arthur A. Backhaus.

By inclining the tubes 14 upwardly in this manner, the alcohol vapors are compelled to pass through the catalytic material, as there are no free spaces above the surfaces thereof along the lengths of the tubes. The alcohol is here changed into the corresponding aldehyde, as for example acetaldehyde, by the catalytic action, and the resulting vapors of aldehyde and alcohol, as well as hydrogen, pass into an upper rear vertical chamber 15, having a removable plate 16 upon its rear face, and thence out through a tube 17.

Upon the front of the fire-box 1, there is a vertically sliding door 18, supported by means of counter-weights 19 and 20, attached thereto by cables 21 and 22 passing over pulleys 23 and 24, respectively. At the rear of the fire-box there is a similar vertically sliding door 25, supported in the same manner, and the details of the supporting mechanism for which will, therefore, not be described.

In the chamber 4, there are, furthermore, provided a downwardly extending baffle plate 25$^a$, and an upwardly and rearwardly extending baffle plate 25$^b$, so as to cause the products of combustion to circulate from the front to the rear and then back to the front of the fire-box.

The vapors of aldehyde and alcohol, as well as hydrogen, which pass upwardly through the pipe 17, are conveyed to a condenser 26, having a coil 27 therein, and which is supplied with a current of cooling water through the agency of inlet and outlet pipes 28 and 29. From the coil 27 the alcohol condensed therein, as well as uncondensed aldehyde and hydrogen, are conveyed away by a pipe 29$^a$ to a receiving tank 30, from which the alcohol may be drawn off by means of a pipe 31. From the tank 30 the uncondensed aldehyde and hydrogen pass out by a pipe 32 to a scrubbing tower or column 33, which is comprised of a plurality of liquid-sealed pans 34, constructed in the same manner in which scrubbing towers or columns are ordinarily made, in which pans a current of absorbing liquid is caused to flow in the opposite direction from an inlet pipe 35 located at the top of the tower. The absorbing liquid may be water or alcohol, but said liquid is preferably comprised of acetic acid, as for example glacial acetic acid, in which the aldehyde formed is very soluble.

In this way, acetic acid containing 50% of acetaldehyde may be obtained and will flow out of the tower by means of an outlet pipe 36 to a receiver 37, from which it may be drawn off by an outlet pipe 38. The hydrogen passes out of the tower 33 by means of a pipe 39, and may be collected in any suitable manner.

In the operation of my apparatus described, assuming that a fire will have been made in the fire-box 1, a quantity of vapors of an alcohol, such for example as ethyl alcohol, is supplied by the pipe 7 to the heating chamber comprised of the tubes 10, where the alcohol vapors are preheated, so as to supply to the vertical chamber 11 vapors heated to a temperature of between 250° and 350° C., but preferably to approximately 300° C. The alcohol vapors then pass into the catalyzer chamber comprising the tubes 14, where they come into contact with the finely divided metallic catalytic agent, as for example copper, and are very largely changed into acetaldehyde, the temperature in the tube 14 being maintained at from 250° to 350° C., but preferably at about 300° C. From this point, the vapors of alcohol and acetaldehyde, together with the hydrogen, are conveyed to the condenser 26, which is maintained at a temperature of from 20° to 30° C., where any alcohol vapors present are condensed and collected in the receiver 30. The acetaldehyde and hydrogen pass into the tower 33, where the ascending vapors of acetaldehyde and hydrogen are subjected to a counter-current of absorbing liquid, such as water, alcohol or acetic acid, although preferably glacial acetic acid, by passing through the series of liquid-sealed pans therein until substantially all of the acetaldehyde has become absorbed in the acetic acid and forms a solution which passes out of the tower 33 by means of the pipe 36. This comprises a solution containing approximately one part of glacial acetic acid and one part of acetaldehyde. The hydrogen passes out of the top of the tower 33 by means of the pipe 39, and may be collected in any suitable manner.

By providing the removable plate 9, 12, 13 and 16, as well as the vertically sliding doors 18 and 25, the chambers 8, 11 and 15 may be readily entered, so as to make any necessary repairs or replacements in the tubes 10 and 14, and so as to introduce a fresh quantity of the catalytic material when desired.

While I have described my invention above in detail, I wish it to be understood that many changes may be made therein without departing from the spirit of the invention.

I claim:

1. In combination, an inclined catalyzer, an alcohol heater located in advance thereof, said catalyzer and alcohol heater being comprised of separate sets of inclined tubes parallel to each other, the catalyzer tubes being inclined downwardly toward the inlet end, a chamber connecting the alcohol heater tubes at the inlet end, a chamber connecting the catalyzer tubes and alcohol heater tubes at the other end, and a chamber connecting the catalyzer tubes at the remaining end, said last-mentioned chamber being located over said first-mentioned chamber.

2. In combination, a catalyzer, an alcohol heater located in advance thereof, said catalyzer and alcohol heater being comprised of separate sets of tubes of substantially equal length, and a vertically sliding door adjacent the ends of the tubes.

3. In combination, a catalyzer, an alcohol heater located in advance thereof, said catalyzer and alcohol heater being comprised of separate sets of tubes parallel to each other, a chamber connecting the alcohol heater tubes at the inlet end, a chamber connecting the catalyzer tubes and alcohol heater tubes at the other end, a chamber connecting the catalyzer tubes at the remaining end, said last-mentioned chamber being located over said first-mentioned chamber, and a vertically sliding door adjacent the ends of the tubes.

4. In combination, a catalyzer, an alcohol heater located in advance thereof, said catalyzer and alcohol heater being comprised of separate sets of tubes, and a chamber adjacent the ends of said tubes having a removable plate on its outer face.

5. In combination, a catalyzer, an alcohol heater located in advance thereof, said catalyzer and alcohol heater being comprised of separate sets of tubes, a chamber adjacent the ends of said tubes having a removable plate on its outer face, and a vertically sliding door adjacent said plate.

6. In combination, a fire-box, a catalyzer, an alcohol heater, said catalyzer and heater being arranged to extend longitudinally of the fire-box and being of substantially equal length, and a chamber connecting adjacent ends of the catalyzer and alcohol heater.

7. In combination, a fire-box, a catalyzer, an alcohol heater, said catalyzer and heater being arranged to extend longitudinally of the fire-box, a chamber connecting two adjacent ends of the catalyzer and alcohol heater, and inlet and outlet chambers located one over the other at the remaining ends of the catalyzer and alcohol heater.

8. In combination, a set of inclined tubes provided on the interior thereof with catalytic material and another set of tubes also inclined and connected to the aforesaid set of tubes in advance thereof, and means to heat both sets of tubes.

9. An apparatus for the catalytic manufacture of aldehydes comprising the combination of a set of inclined tubes containing in the interior thereof catalytic material adapted to convert alcohols to aldehydes, a second set of tubes also inclined and connected to the first mentioned set in advance thereof, and means to heat both sets of tubes.

10. In combination, a set of inclined tubes provided on the interior thereof with catalytic material, chambers connected to the ends of the tubes, a second set of inclined tubes in advance of the first set, chambers connected to the ends of the second set, connecting passages between the chambers at the same ends of the tubes, and means to heat the tubes.

11. In combination, a set of inclined tubes provided on the interior thereof with catalytic material, chambers connected to the ends of the tubes, a second set of inclined tubes in advance of the first set, chambers connected to the ends of the second set, connecting passages between the chambers at the same ends of the tubes, means to heat the tubes, and removable plates on the outsides of the chambers to provide access thereto.

12. In combination, a set of inclined tubes provided on the interior thereof with catalytic material, chambers connected to the ends of the tubes, a second set of inclined tubes in advance of the first set, chambers connected to the ends of the second set, connecting passages between the chambers at the same ends of the tubes, means to heat the tubes, removable plates on the outsides of the chambers to provide access thereto, and doors adjacent said plates.

In testimony that I claim the foregoing I have hereunto set my hand.

ERNEST J. WINTER.

Witnesses:
HERMAN F. WILLKIE,
WILLIAM WATSON.